(12) United States Patent
Tang et al.

(10) Patent No.: US 10,849,082 B2
(45) Date of Patent: Nov. 24, 2020

(54) CONFIGURATION OF MEASUREMENT SUBFRAMES FOR A USER EQUIPMENT (UE)

(71) Applicant: Apple Inc., Cupertino, CA (US)

(72) Inventors: Yang Tang, San Jose, CA (US); Tianyan Pu, Dresden (DE); Anatoliy Ioffe, Beaverton, OR (US); Rui Huang, Beijing (CN); Debdeep Chatterjee, San Jose, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 15/749,487

(22) PCT Filed: Aug. 12, 2016

(86) PCT No.: PCT/US2016/046834
§ 371 (c)(1),
(2) Date: Jan. 31, 2018

(87) PCT Pub. No.: WO2017/027822
PCT Pub. Date: Feb. 16, 2017

(65) Prior Publication Data
US 2018/0220386 A1  Aug. 2, 2018

Related U.S. Application Data

(60) Provisional application No. 62/204,246, filed on Aug. 12, 2015.

(51) Int. Cl.
*H04W 56/00* (2009.01)
*H04L 5/00* (2006.01)
(Continued)

(52) U.S. Cl.
CPC ....... *H04W 56/001* (2013.01); *H04J 11/0073* (2013.01); *H04J 11/0076* (2013.01);
(Continued)

(58) Field of Classification Search
CPC .............. H04W 56/001; H04J 11/0073; H04J 11/0076; H04L 25/0224; H04L 5/005;
(Continued)

(56) References Cited

U.S. PATENT DOCUMENTS

2015/0312784 A1* 10/2015 You .................. H04L 1/0693
                                                   370/252
2015/0365201 A1* 12/2015 Lunttila .................. H04L 5/005
                                                   370/329
(Continued)

FOREIGN PATENT DOCUMENTS

| WO | 2014111155 A1 | 7/2014 |
| WO | 2015114562 A1 | 8/2015 |
| WO | WO2015114562 A1 * | 8/2015 |

*Primary Examiner* — Shailendra Kumar

(57) ABSTRACT

Technology for an eNodeB operable to configure measurement subframes for a user equipment (UE) is disclosed. The eNodeB can identify a first set of orthogonal frequency division multiplexing (OFDM) symbols of a measurement subframe to transmit a plurality of primary synchronization signals (PSS) to the UE in the measurement subframe. The eNodeB can identify a second set of OFDM symbols of the measurement subframe to transmit a plurality of secondary synchronization signals (SSS) to the UE in the measurement subframe. The eNodeB can encode the plurality of primary synchronization signals (PSS) for transmission to the UE using the first set of OFDM symbols of the measurement subframe. The eNodeB can encode the plurality of secondary synchronization signals (SSS) for transmission to the UE using the second set of OFDM symbols of the measurement subframe.

18 Claims, 8 Drawing Sheets

(51) Int. Cl.
*H04L 25/02* (2006.01)
*H04J 11/00* (2006.01)
*H04L 7/00* (2006.01)

(52) U.S. Cl.
CPC ............ *H04L 5/005* (2013.01); *H04L 5/0053* (2013.01); *H04L 7/00* (2013.01); *H04L 25/0224* (2013.01); *H04L 5/001* (2013.01); *H04L 5/0007* (2013.01); *H04L 5/0064* (2013.01); *H04L 5/0069* (2013.01); *H04L 7/0054* (2013.01)

(58) Field of Classification Search
CPC ......... H04L 5/0053; H04L 7/00; H04L 5/001; H04L 7/0054; H04L 5/0069; H04L 5/0007; H04L 5/0064
See application file for complete search history.

(56) References Cited

U.S. PATENT DOCUMENTS

2016/0360452 A1* 12/2016 Koorapaty ........... H04J 11/0069
2017/0070312 A1*  3/2017 Yi ....................... H04J 11/0069

\* cited by examiner

CONFIGURATION OF MEASUREMENT SUBFRAMES FOR A USER EQUIPMENT (UE)

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in uplink (UL). Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems (e.g., Release 13 and earlier), the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
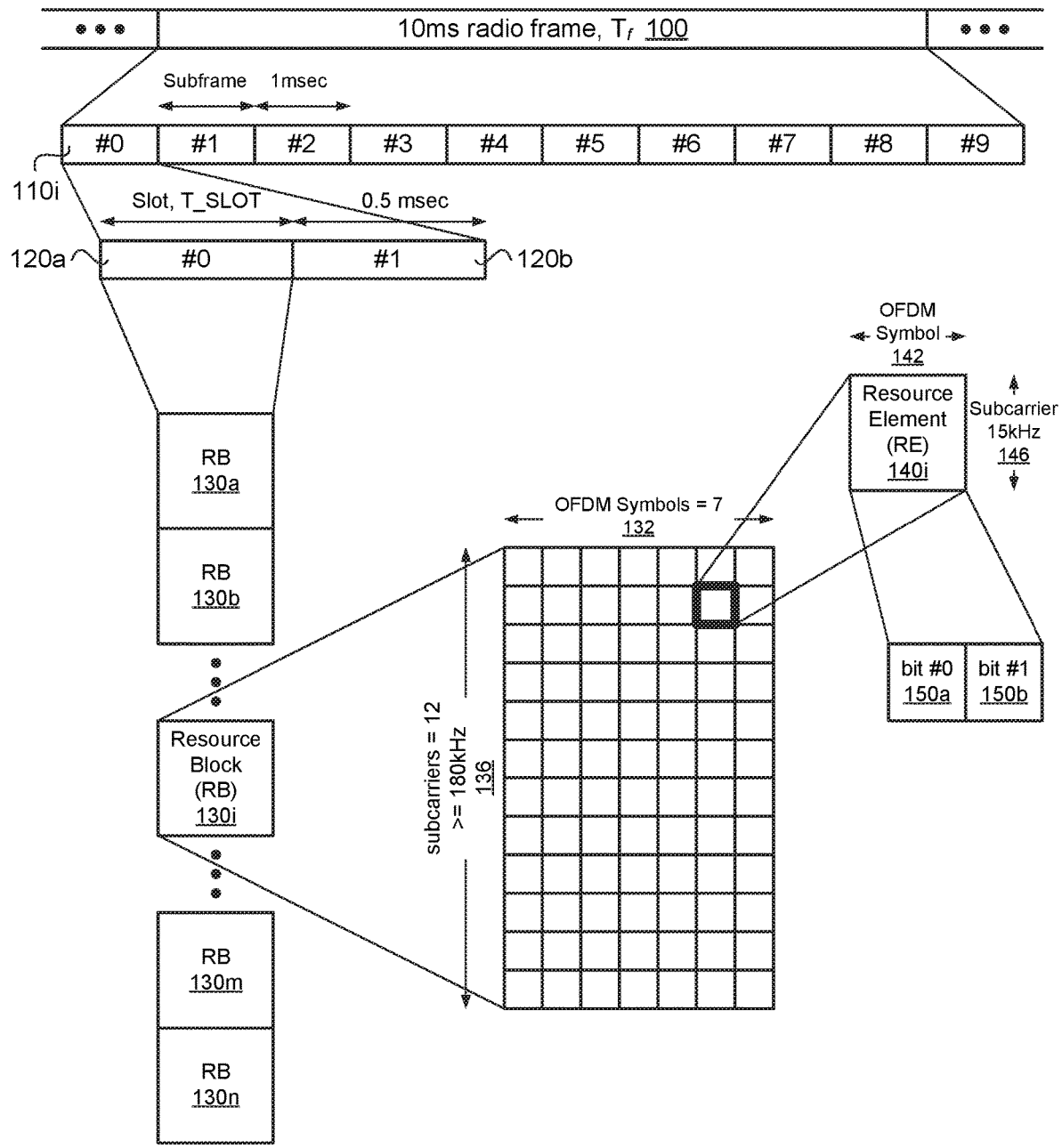
FIG. 1 illustrates a block diagram of an orthogonal frequency division multiple access (OFDMA) frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

As an increased number of communication systems necessitate coverage extensions due to machine type communication (MTC) devices, device to device (D2D) devices, narrowband Internet of Things (IoT) devices, etc., it becomes more challenging to guarantee synchronization and measurement accuracy due to low geometry and/or strong interference levels. In these cases, an increased number of measurement opportunities can be utilized to improve performance. As a result, a relatively large measurement period can be utilized at the cost of synchronization/measurement delay and/or a relatively large measurement duty cycle can be utilized at the cost of power consumption.

In the present technology, a novel measurement subframe structure that can be used to obtain measurements is disclosed. The measurement subframe structure can be dedicatedly used for obtaining measurements (e.g., for coverage extension purposes), and the measurement subframe structure can be associated with a defined periodicity. The measurement subframe structure can include a measurement subframe (or special OFDM subframe) used to improve synchronization and measurement accuracy, as well as delay performance. In accordance with the novel measurement subframe structure, primary synchronization signals (PSS) and secondary synchronization signals (SSS) can be repetitively transmitted in one measurement subframe. The PSS and SSS can be repetitively transmitted on non-cell-specific reference signal (non-CRS) OFDM symbols of the measurement subframe. The measurement subframe can be configured to transmit periodically from an eNodeB to a user equipment (UE), and a position of the measurement subframe can be configured at a frame level. In addition, the novel measurement subframe structure can be transparent to legacy UEs or non-coverage extension UEs.

In contrast, prior solutions are based on an existing LTE subframe structure. In order to achieve coverage extension using the existing LTE subframe structure, a measurement duty cycle can be increased and/or a measurement period can be prolonged. However, the novel measurement subframe structure can maintain (or decrease) the measurement duty cycle and period. As a result, usage of the novel measurement subframe structure can speed up the measurement delay, improve accuracy, and reduce UE power consumption.

Moreover, in prior solutions, the density of the PSS/SSS transmissions can be relatively sparse (e.g., one pair of PSS/SSS can be transmitted every 5 ms). Similarly, the density for the CRS transmissions can be relatively sparse (e.g., one CRS every 2 or 6 resource elements, or REs). The relatively sparse density of the PSS/SSS/CRS transmissions can jeopardize measurements for the coverage extension case. In contrast, the novel measurement subframe structure can enable an increased density of PSS/SSS/CRS transmissions from the eNodeB to the UE. The PSS/SSS/CRS transmissions for synchronization and measurements can be delay sensitive. Without time and frequency synchronization, the UE cannot take measurements and the eNodeB may not know cell status information in a timely manner. Therefore, by increasing the density of the PSS/SSS/CRS transmissions, the UE can perform synchronization and measurements in a more timely manner.

In addition, typical 3GPP LTE systems can rely on wideband measurements for the CRS space. Since the measurement bandwidth can be 10 MHz or 20 MHz in typical 3GPP LTE systems, this can lead to improved performance and reduced measurement delay. However, for MTC and NB IoT, the measurement bandwidth is more limited. For example, for MTC, the maximum bandwidth can be 1.4 MHz. As another example, for NB IoT, the measurement bandwidth can be further reduced to 180 KHz. Therefore, for MTC and NB IoT, the ability to explore frequency diversity is severely restricted as compared to typical 3GPP LTE systems. Therefore, in the present technology, the lack of frequency diversity can be mitigated by exploiting time domain diversity to improve the synchronization and measurement performance.

FIG. 1 illustrates a downlink radio frame structure type 2. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into two slots 120$a$ and 120$b$, each with a duration, $T_{slot}$, of 0.5 ms. Each slot for a component carrier (CC) used by the transmitting station and the receiving station can include multiple resource blocks (RBs) 130$a$, 130$b$, 130$i$, 130$m$, and 130$n$ based on the CC frequency bandwidth. The CC can have a carrier frequency having a bandwidth and center frequency. Each RB (physical RB or PRB) 130$i$ can include 12-15 kHz subcarriers 136 (on the frequency axis) and 6 or 7 orthogonal frequency-division multiplexing (OFDM) symbols 132 (on the time axis) per subcarrier. The RB can use seven OFDM symbols if a short or normal cyclic prefix is employed. The RB can use six OFDM symbols if an extended cyclic prefix is used. The resource block can be mapped to 84 resource elements (REs) 140$i$ using short or normal cyclic prefixing, or the resource block can be mapped to 72 REs (not shown) using extended cyclic prefixing. The RE can be a unit of one OFDM symbol 142 by one subcarrier (i.e., 15 kHz) 146. Each RE can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

In one example, wireless communication systems can implement synchronization signals. The synchronization signals can include primary synchronization signals (PSS) and secondary synchronization signals (SSS). After powering on, a user equipment (UE) can obtain time and frequency synchronization with the network. The UE can use the PSS and SSS to achieve radio frame, subframe, slot and symbol synchronization in a time domain. In addition, the UE can use the PSS and SSS to identify a center bandwidth in a frequency domain and deduce a physical cell identity (PCI).

Figure 2:
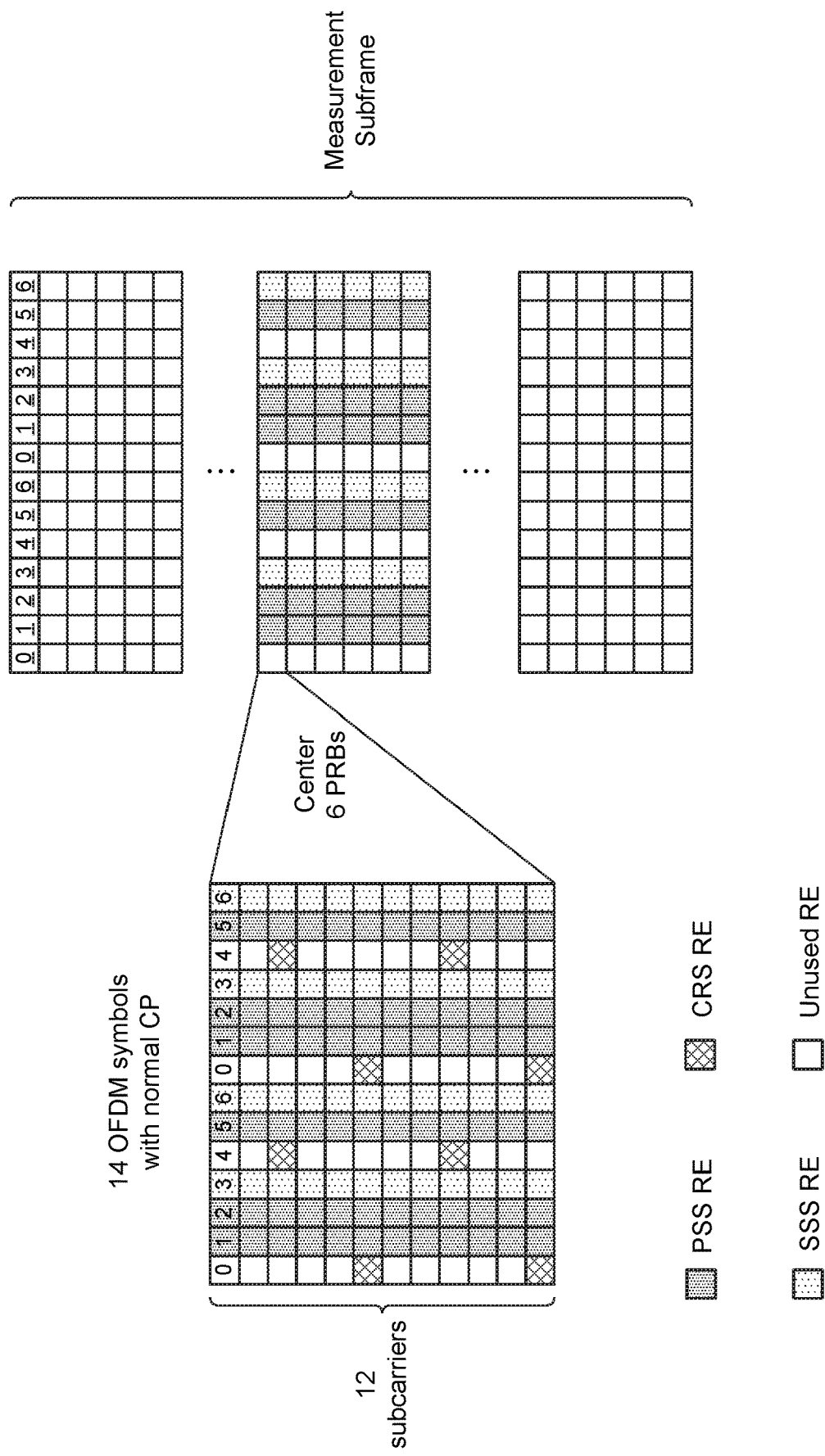
FIG. 2 illustrates a measurement subframe for transmitting a plurality of primary synchronization signals (PSS) and a plurality of secondary synchronization signals (SSS) in accordance with an example.

FIG. 2 illustrates an exemplary measurement subframe for transmitting a plurality of primary synchronization signals (PSS) and a plurality of secondary synchronization signals (SSS). The measurement subframe can be configured at an eNodeB, and the measurement subframe can be transmitted from the eNodeB to a user equipment (UE). In other words, the measurement subframe with the PSS/SSS repetitions can be transmitted by the eNodeB and detected by the UE. The measurement subframe can be received by UEs configured for machine type communication (MTC), device to device (D2D) communication or narrowband Internet of Things (IoT) communication.

In one example, the eNodeB can select a first set of OFDM symbols of the measurement subframe to transmit the PSS, and the eNodeB can select a second set of OFDM symbols of the measurement subframe to transmit the SSS. The eNodeB can transmit the PSS and the SSS using the first and second sets of OFDM symbols of the measurement subframe, respectively. Therefore, the eNodeB can transmit multiple copies of the PSS and SSS in a single measurement subframe, which can enable the UE to perform synchronization in a reduced amount of time and take measurements with improved accuracy.

In one example, the measurement subframe can be configured with the same dimensions as compared to legacy LTE subframes with a standard (or normal) cyclic prefix (CP) or extended CP. With a certain system bandwidth, the measurement subframe can contain the same number of resource blocks (RBs) and OFDM symbols as compared to legacy LTE subframes.

As shown in FIG. 2, the measurement subframe can have two cell-specific reference signal (CRS) antenna ports (APs) and a bandwidth of approximately 1.4 MHz. With a standard CP, the center 6 physical resource blocks (PRBs) (e.g., 72 subcarriers) can cross two slots, wherein each slot has 7 OFDM symbols. The 7 OFDM symbols in each slot can range from 0 to 6. In this example, symbols 0 and 4 in each slot can carry CRS, and symbols 0 and 4 can be referred to as CRS OFDM symbols. The other symbols in each slot (i.e., symbols 1, 2, 3, 4 and 5) can be referred to as non-CRS OFDM symbols. In one example, symbols 1, 2 and 5 in each slot can carry the PSS, and symbols 3 and 6 in each slot can carry the SSS. Therefore, in this example, the PSS can be transmitted 6 times in the measurement subframe and the SSS can be transmitted 4 times in the measurement subframe.

In an alternative example (not shown), when the measurement subframe has four CRS APs, symbols 0, 1 and 4 can carry CRS, and therefore, can be referred to as the CRS OFDM symbols. The other symbols in each slot (i.e., symbols 2, 3, 5 and 6) are the non-CRS OFDM symbols. Therefore, the symbols 2, 3, 5 and 6 in the measurement subframe can be used to transmit the PSS and/or SSS to the UE.

As previously discussed, the measurement subframe can include CRS OFDM symbols and non-CRS OFDM symbols, wherein the CRS OFDM symbols can be used to transmit CRS to the UE and the non-CRS OFDM symbols can be used to transmit PSS/SSS to the UE. In one example, in the CRS OFDM symbols, resource elements (RE) used to carry the CRS in accordance with earlier versions of the 3GPP LTE standard (e.g., Release 12 and earlier) can remain unchanged. In other words, when certain REs are defined as CRS REs by the 3GPP LTE standard, then CRS can continue to be transmitted on those REs. The other REs in the CRS OFDM symbols can be referred to as non-CRS REs. The measurement subframe can be backward compatible and transparent to legacy UEs. In addition, the non-CRS REs in the CRS OFDM symbols can be kept blank to reduce inter-cell interference.

As shown in FIG. 2, in this example, symbols 0 and 4 are CRS OFDM symbols and symbols 1, 2, 3, 5 and 6 are non-CRS OFDM symbols. In symbols 0 and 4, certain REs are CRS REs (i.e., used to transmit CRS), while other REs are unused REs. In symbols 1, 2 and 5, all PSS REs across the 12 subcarriers are used to transmit the PSS, and in symbols 3 and 6, all SSS REs across the 12 subcarriers are used to transmit the SSS.

In one configuration, the measurement subframe can be a special subframe that is periodically transmitted from the eNodeB to the UE. The measurement subframe can be dedicated for PSS/SSS transmissions. For example, one measurement subframe can transmit 6 copies of the PSS and 4 copies of the SSS, while in contrast, legacy systems only transmit one pair of the PSS and SSS per subframe every 5 ms. Therefore, the density of the PSS/SSS can be increased 4 to 6 times as compared to legacy systems. In addition, certain OFDM symbols (i.e., CRS OFDM symbols) are not occupied by the synchronization signals since these OFDM symbols are used by legacy systems to transmit CRS, such that the measurement subframe is backward compatible with legacy UEs. Furthermore, the measurement subframe can be used to transmit CRS to the UE, so the measurement subframe can be used by the UE for measurement purposes as well.

In one configuration, non-CRS REs in the CRS OFDM symbols can be configured as blank (i.e., as unused REs), which can maintain a relatively low cross-cell or inter-cell interference. In an alternative configuration, non-CRS REs can be used to carry special cell-specific reference signals (S-CRS) for measurement (i.e., these REs are not unused), which can increase a reference symbol density. The S-CRS can be defined similar as the CRS in existing LTE systems. In yet another alternative configuration, a first portion of non-CRS REs in the CRS OFDM symbols can be used to carry the S-CRS for measurements (which can increase reference symbol density), and a second portion (or remaining portion) of non-CRS REs in the CRS OFDM symbols can be configured as blank to reduce the cross-cell or inter-cell interference.

In one configuration, the measurement subframe can have 2 CRS antenna ports. In this case, the measurement subframe can have 5 non-CRS OFDM symbols per slot in which the PSS/SSS can be repetitively transmitted to the UE. The repetitive transmission of the PSS/SSS can have several benefits. For example, coherent combining can be used to boost PSS/SSS detection signal to noise ratio (SNR). Since the PSS/SSS can be repetitively transmitted within a single subframe, the coherent combining can be feasible even with an increased Doppler frequency/shift, which can benefit cell identification and time/frequency synchronization performances. In addition, successful detection of the PSS/SSS can enable the UE to use the PSS/SSS as reference symbols for measurement purposes, which can benefit cell measurement performance. Examples of cell measurements include Received Signal Strength Indicator (RSSI) and Reference Signal Received Power (RSRP).

In one configuration, with a standard cyclic prefix (CP) and 2 CRS APs, the PSS can be repetitively transmitted in symbols 1, 2 and 5 of the measurement subframe, and the SSS can be repetitively transmitted in symbols 3 and 6 of the measurement subframe. The symbols 1, 2, 3, 5 and 6 can be referred to as non-CRS OFDM symbols in the measurement subframe.

In one configuration, with a standard CP and 2 CRS APs, the PSS can be repetitively transmitted in symbols 2 and 5 of the measurement subframe, and the SSS can be repetitively transmitted in symbols 3 and 6 of the measurement subframe. In this configuration, symbol 1 can be configured as blank.

In one configuration, with a standard CP and 2 CRS APs, the PSS can be transmitted using symbol 5 and the SSS can be transmitted using symbol 6, which can achieve backward compatibility. In addition, other non-CRS OFDM symbols can be used for either the PSS or SSS depending on different PSS/SSS repetition patterns.

In one configuration, the measurement subframe can have 4 CRS antenna ports. In this case, the measurement subframe can have 3 CRS OFDM symbols (e.g., symbols 0, 1 and 4) and 4 non-CRS OFDM symbols per slot.

In one configuration, with a standard CP and 4 CRS APs, the PSS can be repetitively transmitted in symbols 2 and 5 of the measurement subframe, and the SSS can be repetitively transmitted in symbols 3 and 6 of the measurement subframe.

In one configuration, with a standard CP and 4 CRS APs, the PSS can be transmitted using symbol 5 and the SSS can be transmitted using symbol 6, which can achieve backward compatibility. In addition, other non-CRS OFDM symbols can be used for either the PSS or SSS depending on different PSS/SSS repetition patterns.

In alternative configurations, the cyclic prefix (CP) can be an extended CP, as opposed to a normal CP or standard CP. Configurations for CRS OFDM symbols for standard cyclic CP cases can also apply to extended CP cases. For non-CRS OFDM symbols with extended CP, several configurations are described as follows.

In one configuration, with an extended CP and 2 CRS APs, the PSS can be repetitively transmitted in symbols 2 and 5 of the measurement subframe, and the SSS can be repetitively transmitted in symbols 3 and 6 of the measurement subframe.

In one configuration, with an extended CP and 2 CRS APs, the PSS can be transmitted using symbol 4 and the SSS can be transmitted using symbol 5, which can achieve backward compatibility. In addition, other non-CRS OFDM symbols can be used for either the PSS or SSS depending on different PSS/SSS repetition patterns.

In one configuration, with an extended CP and 4 CRS APs, the PSS can be transmitted using symbol 4 and the SSS can be transmitted using symbol 5, which can achieve backward compatibility. In addition, other non-CRS OFDM symbols can be used for either the PSS or SSS depending on different PSS/SSS repetition patterns.

As described above, the measurement subframe can be specifically configured to transmit an increased number of PSS and SSS to the UE. The measurement subframe can include 2 CRS APs or 4 CRS APs. When 4 CRS APs are utilized, the CRS can occupy a greater number of OFDM symbols. Based on whether the CP is standard or extended, as well as the number of CRS APs (e.g., 2 or 4), certain sets of OFDM symbols can be configured by the eNodeB to transmit the PSS and SSS in the measurement subframe to the UE, respectively. In other words, depending on the CP and the number of CRS APs, a first set of OFDM symbols can be configured by the eNodeB to transmit the PSS to the UE, and a second set of OFDM symbols can be configured by the eNodeB to transmit the SSS to the UE. Each of the first set of OFDM symbols and the second set of OFDM symbols can be configured to transmit a plurality of PSS and SSS, respectively. The first and second sets of OFDM symbols can be configured in the same subframe, which enables multiple copies of the PSS and SSS to be transmitted in the measurement subframe.

Figure 3:
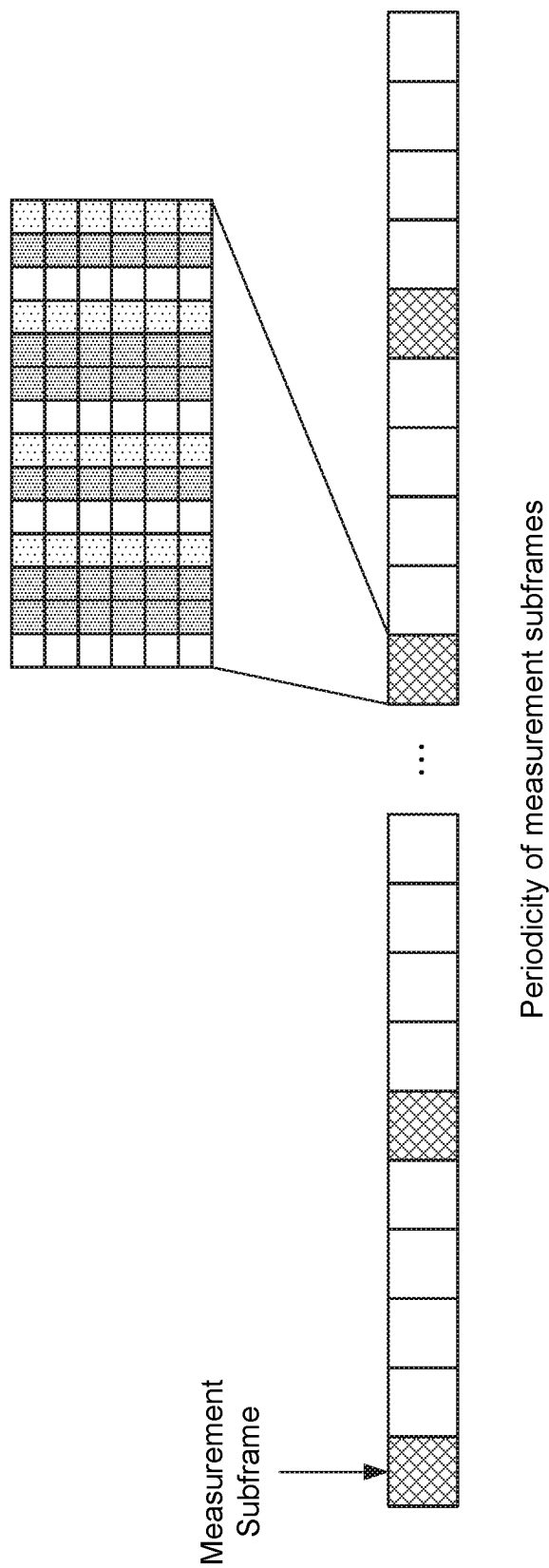
FIG. 3 illustrates a position and periodicity of a measurement subframe in accordance with an example.

FIG. 3 illustrates an exemplary position and periodicity of a measurement subframe. The position of the measurement subframe, as well as the periodicity of the measurement subframe, can be configurable at the eNodeB. In one example, the measurement subframe can occur on subframe 0 and/or subframe 5 in a given radio frame, which can reduce the impact on legacy UEs. In other words, the position of the measurement subframe can be subframes 0 and/or 5 in the given radio frame. In one example, the measurement subframe can occur on subframes in which PSS/SSS are transmitted in legacy LTE systems, which can reduce the impact on the legacy UE's scheduling opportunity and overall system performance.

In one example, the eNodeB can configure the periodicity of the measurement subframe based on a velocity or speed of the UE. In addition, the eNodeB can configure the periodicity of the measurement subframe based on the delay sensitivity of the UE. As non-limiting examples, the periodicity of the measurement subframe can be 40 ms, 80 ms or 160 ms.

In one configuration, an eNodeB can transmit a measurement subframe to a user equipment (UE). The UE can be configured for narrowband IoT or MTC. The measurement subframe can include multiple copies of PSS and SSS. In other words, multiple copies of PSS and SSS can be transmitted in the measurement subframe. In one example, the measurement subframe can include CRS OFDM symbols, and non-CRS REs in the CRS OFDM symbol can be configured as blank to reduce inter-cell interference. In another example, CRS can be transmitted on all non-CRS REs in the CRS OFDM symbol to increase a reference symbol density. In yet another example, a first portion of non-CRS REs in the CRS OFDM symbol can be used to transmit CRS, and a second portion of non-CRS REs in the CRS OFDM symbol can be configured as blank.

In one example, with a standard cyclic prefix (CP) for both slots in the measurement subframe and two CRS antenna ports (APs), the PSS can be repetitively transmitted in symbol 1, 2 and 5, and the SSS can be repetitively transmitted in symbol 3 and 6. In another example, with a standard cyclic prefix (CP) for both slots in the measurement subframe and two CRS antenna ports (APs), the PSS can be repetitively transmitted in symbol 2 and 5, and the SSS can be repetitively transmitted in symbol 3 and 6. In this example, symbol 1 can be blank. In yet another example, with a standard cyclic prefix (CP) for both slots in the measurement subframe and two CRS antenna ports (APs), symbol 5 can always be used to transmit the PSS and symbol 6 can always be used to transmit the SSS to achieve backward compatibility. In addition, other non-CRS OFDM symbols can be used for either the PSS or SSS depending on different PSS/SSS repetition patterns.

In one example, with a standard cyclic prefix (CP) for both slots in the measurement subframe and four CRS antenna ports (APs), the PSS can be repetitively transmitted in symbol 2 and 5, and the SSS can be repetitively transmitted in symbol 3 and 6. In another example, with a standard cyclic prefix (CP) for both slots in the measurement subframe and four CRS antenna ports (APs), symbol 5 can always be used to transmit the PSS and symbol 6 can always be used to transmit the SSS to achieve backward compatibility. In addition, other non-CRS OFDM symbols can be used for either the PSS or SSS depending on different PSS/SSS repetition patterns.

In one example, with an extended cyclic prefix (CP) for both slots in the measurement subframe and two CRS antenna ports (APs), the PSS can be repetitively transmitted in symbol 1 and 4, and the SSS can be repetitively transmitted in symbol 2 and 5. In another example, with an extended cyclic prefix (CP) for both slots in the measurement subframe and two CRS antenna ports (APs), symbol 4 can always be used to transmit the PSS and symbol 5 can always be used to transmit the SSS to achieve backward compatibility. In addition, other non-CRS OFDM symbols can be used for either the PSS or SSS depending on different PSS/SSS repetition patterns. In yet another example, with an extended cyclic prefix (CP) for both slots in the measurement subframe and four CRS antenna ports (APs), symbol 4 can always be used to transmit the PSS and symbol 5 can always be used to transmit the SSS to achieve backward compatibility. In addition, other non-CRS OFDM symbols can be used for either the PSS or SSS depending on different PSS/SSS repetition patterns.

In one configuration, a measurement subframe position and periodicity can be configured at the eNodeB. To reduce the impact on legacy UEs, the measurement subframe can be on subframe 0 and/or subframe 5 in a given frame. In addition, the periodicity of the measurement subframe can be configured based on a velocity and/or delay sensitivity of the UE. For example, the periodicity can be 40 ms, 80 ms, 160 ms, etc.

Figure 4:
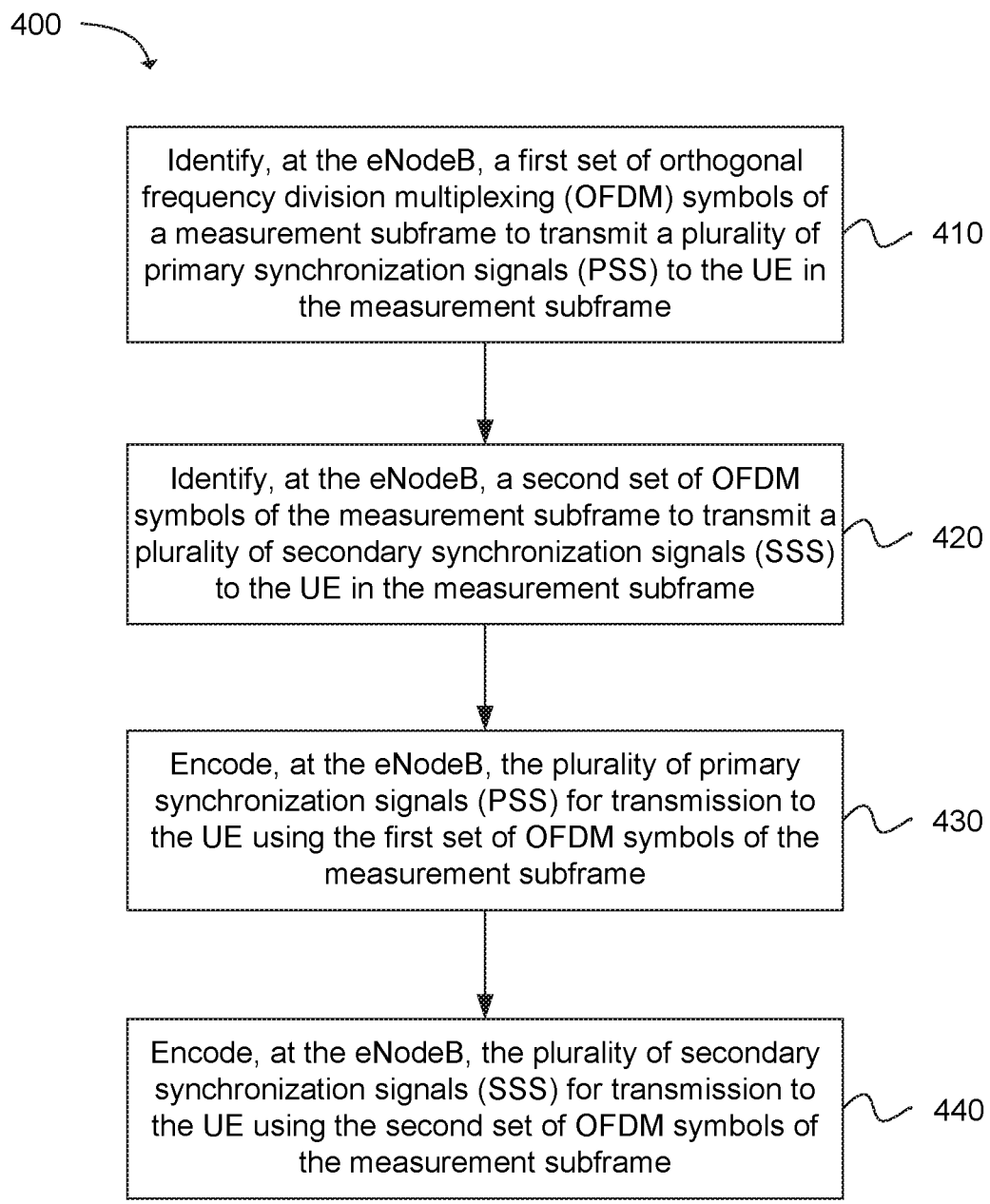
FIG. 4 depicts functionality of an eNodeB operable to configure measurement subframes for a user equipment (UE) in accordance with an example.

Another example provides functionality 400 of an eNodeB operable to configure measurement subframes for a user equipment (UE), as shown in FIG. 4. The eNodeB can comprise one or more processors and memory configured to: identify, at the eNodeB, a first set of orthogonal frequency division multiplexing (OFDM) symbols of a measurement subframe to transmit a plurality of primary synchronization signals (PSS) to the UE in the measurement subframe, as in block 410. The eNodeB can comprise one or more processors and memory configured to: identify, at the eNodeB, a second set of OFDM symbols of the measurement subframe to transmit a plurality of secondary synchronization signals (SSS) to the UE in the measurement subframe, as in block 420. The eNodeB can comprise one or more processors and memory configured to: encode, at the eNodeB, the plurality of primary synchronization signals (PSS) for transmission to the UE using the first set of OFDM symbols of the measurement subframe, as in block 430. The eNodeB can comprise one or more processors and memory configured to: encode, at the eNodeB, the plurality of secondary synchronization signals (SSS) for transmission to the UE using the second set of OFDM symbols of the measurement subframe, as in block 440.

Figure 5:
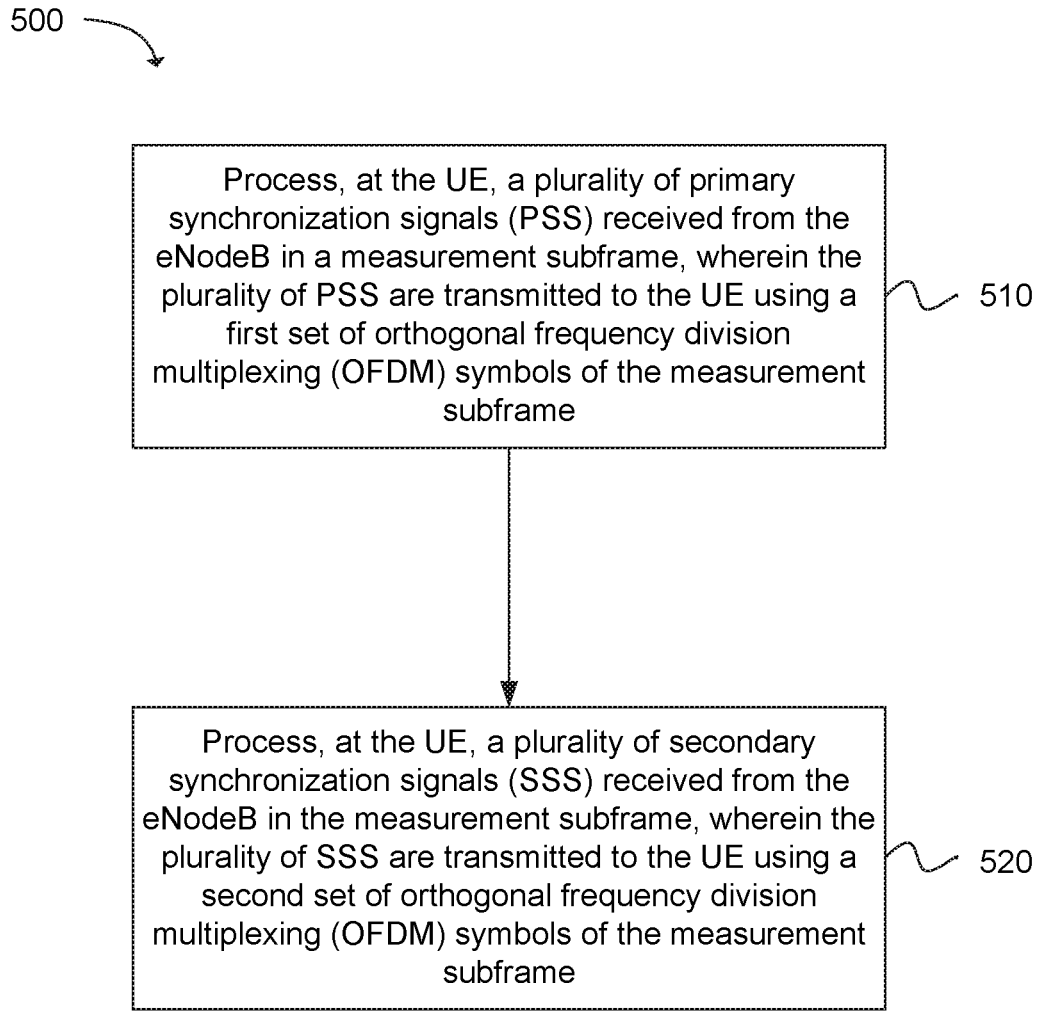
FIG. 5 depicts functionality of a user equipment (UE) operable to process synchronization signals received from an eNodeB in accordance with an example.

Another example provides functionality 500 of a user equipment (UE) operable to process synchronization signals received from an eNodeB, as shown in FIG. 5. The UE can comprise one or more processors and memory configured to: process, at the UE, a plurality of primary synchronization signals (PSS) received from the eNodeB in a measurement subframe, wherein the plurality of PSS are transmitted to the UE using a first set of orthogonal frequency division multiplexing (OFDM) symbols of the measurement subframe, as in block 510. The UE can comprise one or more processors and memory configured to: process, at the UE, a plurality of secondary synchronization signals (SSS) received from the eNodeB in the measurement subframe, wherein the plurality of SSS are transmitted to the UE using a second set of orthogonal frequency division multiplexing (OFDM) symbols of the measurement subframe, as in block 520.

Figure 6:
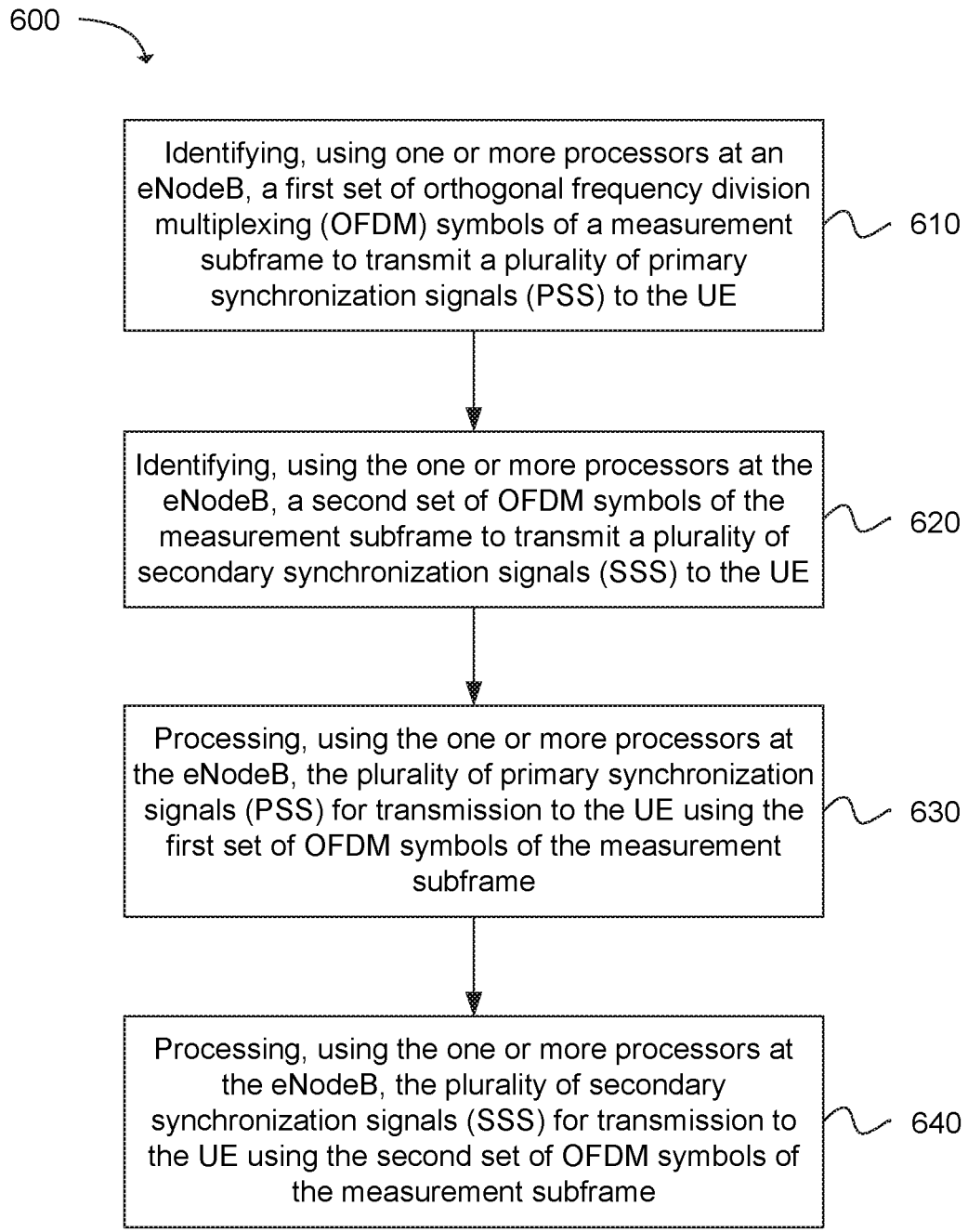
FIG. 6 depicts a flowchart of a machine readable storage medium having instructions embodied thereon for configuring measurement subframes for a user equipment (UE) in accordance with an example.

Another example provides at least one machine readable storage medium having instructions 600 embodied thereon for configuring measurement subframes for a user equipment (UE), as shown in FIG. 6. The instructions can be executed on a machine, where the instructions are included on at least one computer readable medium or one non-transitory machine readable storage medium. The instructions when executed perform: identifying, using one or more processors at an eNodeB, a first set of orthogonal frequency division multiplexing (OFDM) symbols of a measurement subframe to transmit a plurality of primary synchronization signals (PSS) to the UE, as in block 610. The instructions when executed perform: identifying, using the one or more processors at the eNodeB, a second set of OFDM symbols of the measurement subframe to transmit a plurality of secondary synchronization signals (SSS) to the UE, as in block 620. The instructions when executed perform: processing, using the one or more processors at the eNodeB, the plurality of primary synchronization signals (PSS) for transmission to the UE using the first set of OFDM symbols of the measurement subframe, as in block 630. The instructions when executed perform: processing, using the one or more processors at the eNodeB, the plurality of secondary synchronization signals (SSS) for transmission to the UE using the second set of OFDM symbols of the measurement subframe, as in block 640.

Figure 7:
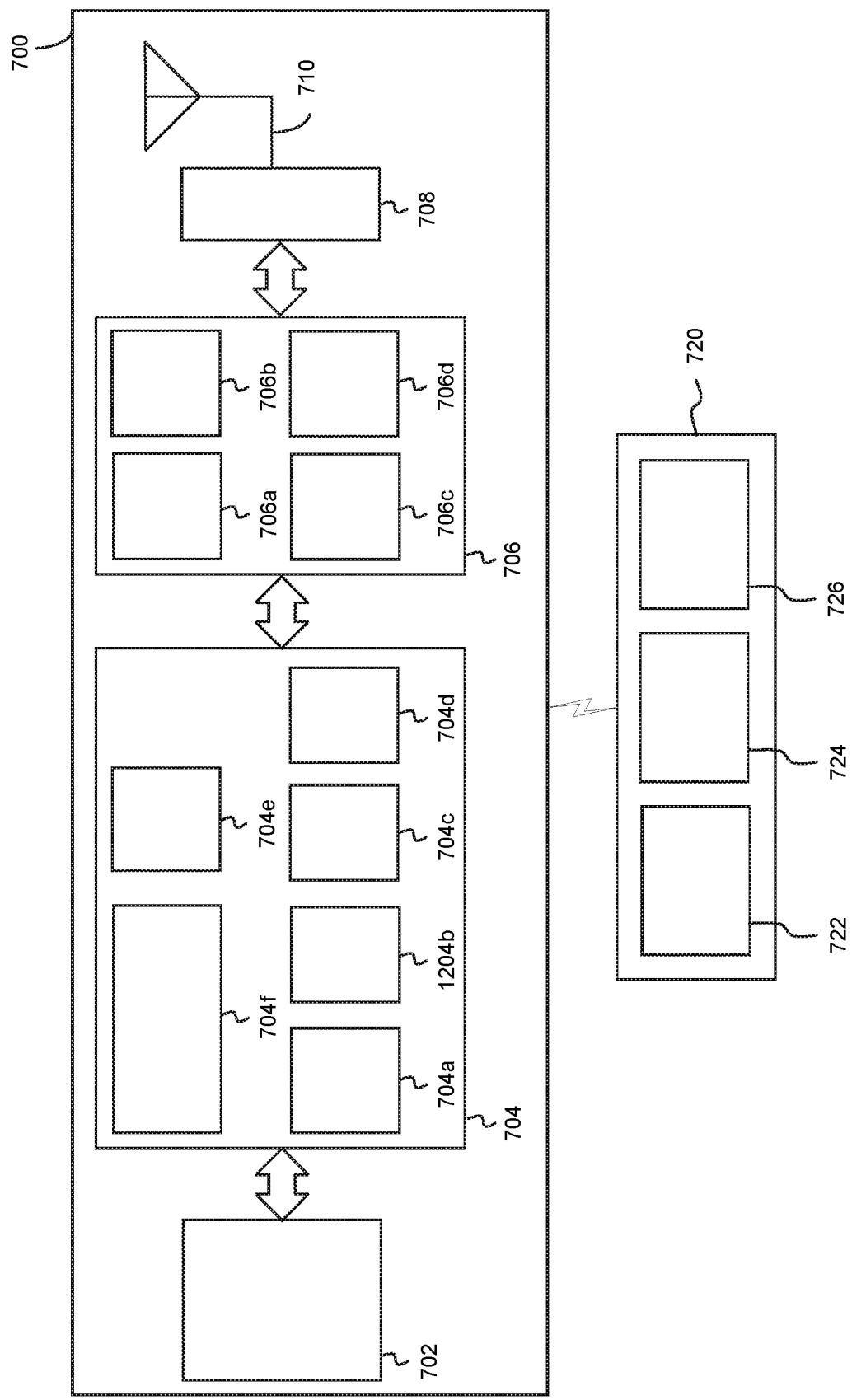
FIG. 7 illustrates a diagram of a wireless device (e.g., UE) and a base station (e.g., eNodeB) in accordance with an example.

FIG. 7 provides an example illustration of a user equipment (UE) device 700 and a node 720. The UE device 700 can include a wireless device, a mobile station (MS), a mobile wireless device, a mobile communication device, a tablet, a handset, or other type of wireless device. The UE device 700 can include one or more antennas configured to communicate with the node 720 or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The node 720 can include one or more processors 722, memory 724 and a transceiver 726. The UE device 700 can be configured to communicate using at least one wireless communication standard including 3GPP LTE, WiMAX, High Speed Packet Access (HSPA), Bluetooth, and WiFi. The UE device 700 can communicate using separate antennas for each wireless communication standard or shared antennas for multiple wireless communication standards. The UE device 700 can communicate in a wireless local area network (WLAN), a wireless personal area network (WPAN), and/or a WWAN.

In some embodiments, the UE device 700 may include application circuitry 702, baseband circuitry 704, Radio Frequency (RF) circuitry 706, front-end module (FEM) circuitry 708 and one or more antennas 710, coupled together at least as shown. In addition, the node 720 may include, similar to that described for the UE device 700, application circuitry, baseband circuitry, Radio Frequency (RF) circuitry, front-end module (FEM) circuitry and one or more antennas The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with and/or may include a storage medium, and may be configured to execute instructions stored in the storage medium to enable various applications and/or operating systems to run on the system.

The baseband circuitry 704 may include circuitry such as, but not limited to, one or more single-core or multi-core processors. The baseband circuitry 704 may include one or more baseband processors and/or control logic to process baseband signals received from a receive signal path of the RF circuitry 706 and to generate baseband signals for a transmit signal path of the RF circuitry 706. Baseband processing circuity 704 may interface with the application circuitry 702 for generation and processing of the baseband signals and for controlling operations of the RF circuitry 706. For example, in some embodiments, the baseband circuitry 704 may include a second generation (2G) baseband processor 704*a*, third generation (3G) baseband processor 704*b*, fourth generation (4G) baseband processor 704*c*, and/or other baseband processor(s) 704*d* for other existing generations, generations in development or to be developed in the future (e.g., fifth generation (5G), 6G, etc.). The baseband circuitry 704 (e.g., one or more of baseband processors 704*a-d*) may handle various radio control functions that enable communication with one or more radio networks via the RF circuitry 706. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, and/or constellation mapping/demapping functionality. In some embodiments, encoding/decoding circuitry of the baseband circuitry 704 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 704*e* of the baseband circuitry 704 may be configured to run elements of the protocol stack for signaling of the PHY, MAC, RLC, PDCP and/or RRC layers. In some embodiments, the baseband circuitry may include one or more audio digital signal processor(s) (DSP) 704*f*. The audio DSP(s) 104*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

The RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the RF circuitry 706 may include a receive signal path and a transmit signal path. The receive signal path of the RF circuitry 706 may include mixer circuitry 706a, amplifier circuitry 706b and filter circuitry 706c. The transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a necessity. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c. The filter circuitry 706c may include a low-pass filter (LPF), although the scope of the embodiments is not limited in this respect.

In some embodiments, the mixer circuitry 706a of the receive signal path and the mixer circuitry 706a of the transmit signal path may include two or more mixers and may be arranged for quadrature down-conversion and/or up-conversion respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a may be arranged for direct down-conversion and/or direct up-conversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a necessity. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency)

and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710.

In some embodiments, the FEM circuitry 708 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710.

Figure 8:
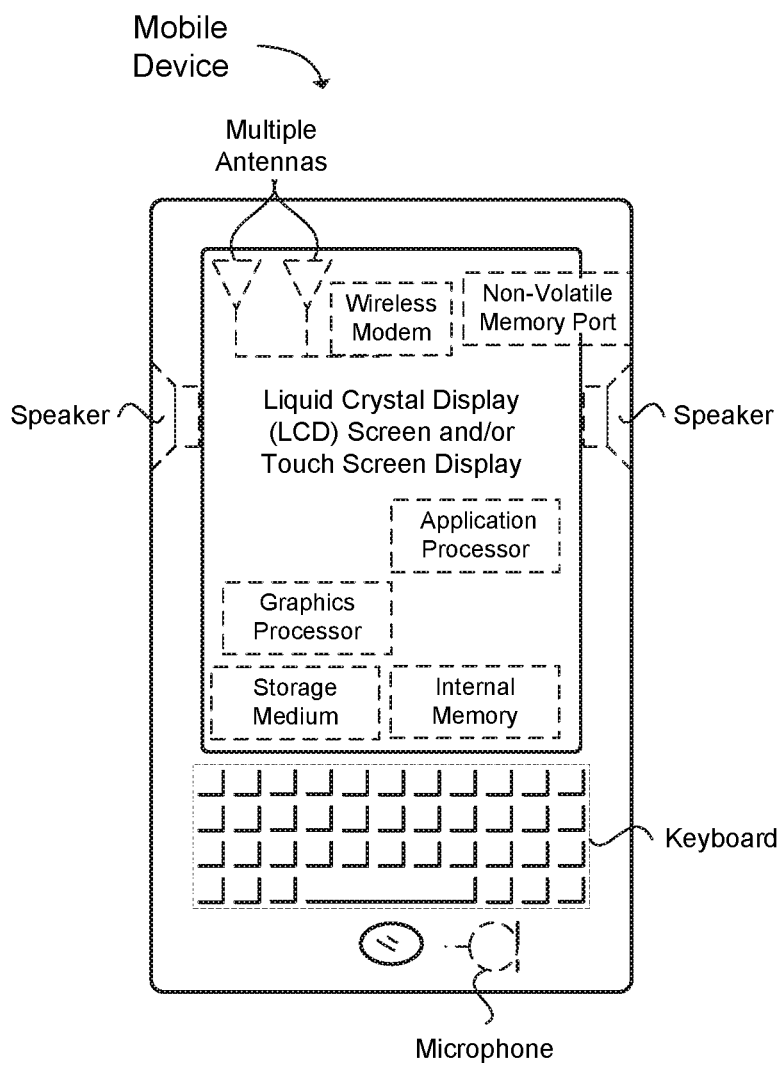
FIG. 8 illustrates a diagram of a wireless device (e.g., UE) in accordance with an example.

FIG. 8 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 8 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of an eNodeB operable to configure measurement subframes for a user equipment (UE), the apparatus comprising one or more processors and memory configured to: identify, at the eNodeB, a first set of orthogonal frequency division multiplexing (OFDM) symbols of a measurement subframe to transmit a plurality of primary synchronization signals (PSS) to the UE in the measurement subframe; identify, at the eNodeB, a second set of OFDM symbols of the measurement subframe to transmit a plurality of secondary synchronization signals (SSS) to the UE in the measurement subframe; encode, at the eNodeB, the plurality of primary synchronization signals (PSS) for transmission to the UE using the first set of OFDM symbols of the measurement subframe; and encode, at the eNodeB, the plurality of secondary synchronization signals (SSS) for transmission to the UE using the second set of OFDM symbols of the measurement subframe.

Example 2 includes the apparatus of Example 1, further comprising a transceiver configured to: transmit the plurality of primary synchronization signals (PSS) to the UE using the first set of OFDM symbols of the measurement subframe; and transmit the plurality of secondary synchronization signals (SSS) to the UE using the second set of OFDM symbols of the measurement subframe.

Example 3 includes the apparatus of any of Examples 1 to 2, wherein the plurality of PSS and the plurality of SSS are transmitted from the eNodeB to the UE using non-cell specific reference signal (non-CRS) OFDM symbols of a single measurement subframe.

Example 4 includes the apparatus of any of Examples 1 to 3, wherein: the first set of OFDM symbols is configured based on a number of cell-specific reference signal (CRS) antenna ports (APs); and the second set of OFDM symbols is configured based on the number of CRS APs.

Example 5 includes the apparatus of any of Examples 1 to 4, wherein the measurement subframe includes cell-specific reference signal (CRS) OFDM symbols and non-CRS OFDM symbols, wherein the CRS OFDM symbols include CRS resource elements (REs) and non-CRS REs.

Example 6 includes the apparatus of any of Examples 1 to 5, wherein the non-CRS REs in the CRS OFDM symbols are configured as blank.

Example 7 includes the apparatus of any of Examples 1 to 6, wherein the one or more processors and memory are further configured to: process CRS on non-CRS REs in the CRS OFDM symbols for transmission to the UE.

Example 8 includes the apparatus of any of Examples 1 to 7, wherein: a first portion of the non-CRS REs in the CRS OFDM symbols are configured as blank to reduce inter-cell interference and a second portion of the non-CRS REs in the CRS OFDM symbols are used to transmit CRS to increase a reference symbol density.

Example 9 includes the apparatus of any of Examples 1 to 8, wherein: the PSS is repetitively transmitted in the first set of OFDM symbols in the measurement subframe, and the first set of OFDM symbols includes symbols 1, 2 and 5; and the SSS is repetitively transmitted in the second set of OFDM symbols in the measurement subframe, and the second set of OFDM symbols includes symbols 3 and 6, wherein the measurement subframe includes a non-extended cyclic prefix (CP) for a first slot and a second slot included in the measurement subframe, and a number of cell-specific reference signal (CRS) antenna ports (APs) is two.

Example 10 includes the apparatus of any of Examples 1 to 9, wherein: the PSS is repetitively transmitted in the first set of OFDM symbols in the measurement subframe, and the first set of OFDM symbols includes symbols 2 and 5; and the SSS is repetitively transmitted in the second set of OFDM symbols in the measurement subframe, and the second set of OFDM symbols includes symbols 3 and 6, wherein: the measurement subframe includes a non-extended cyclic prefix (CP) for a first slot and a second slot included in the measurement subframe, a number of cell-specific reference signal (CRS) antenna ports (APs) is two, and symbol 1 is blank.

Example 11 includes the apparatus of any of Examples 1 to 10, wherein: the PSS is repetitively transmitted in the first set of OFDM symbols in the measurement subframe, and the first set of OFDM symbols includes symbols 2 and 5; and the SSS is repetitively transmitted in the second set of OFDM symbols in the measurement subframe, and the second set of OFDM symbols includes symbols 3 and 6, wherein the measurement subframe includes a non-extended cyclic prefix (CP) for a first slot and a second slot included in the measurement subframe, and a number of cell-specific reference signal (CRS) antenna ports (APs) is four.

Example 12 includes the apparatus of any of Examples 1 to 11, wherein: the PSS is repetitively transmitted in the first set of OFDM symbols in the measurement subframe, and the first set of OFDM symbols includes symbols 1 and 4; and the SSS is repetitively transmitted in the second set of OFDM symbols in the measurement subframe, and the second set of OFDM symbols includes symbols 2 and 5, wherein the measurement subframe includes an extended cyclic prefix (CP) for both slots and a number of cell-specific reference signal (CRS) antenna ports (APs) is two.

Example 13 includes the apparatus of any of Examples 1 to 12, wherein the measurement subframe occurs on at least one of subframe 0 and subframe 5 in a given frame.

Example 14 includes the apparatus of any of Examples 1 to 13, wherein a periodicity of the measurement subframe is configured based on a velocity of the UE and a delay sensitivity of the UE, wherein the periodicity of the measurement subframe is configured as 40 milliseconds (ms), 80 ms or 160 ms.

Example 15 includes an apparatus of a user equipment (UE) operable to process synchronization signals received from an eNodeB, the apparatus comprising one or more processors and memory configured to: process, at the UE, a plurality of primary synchronization signals (PSS) received from the eNodeB in a measurement subframe, wherein the plurality of PSS are transmitted to the UE using a first set of orthogonal frequency division multiplexing (OFDM) symbols of the measurement subframe; and process, at the UE, a plurality of secondary synchronization signals (SSS) received from the eNodeB in the measurement subframe, wherein the plurality of SSS are transmitted to the UE using a second set of orthogonal frequency division multiplexing (OFDM) symbols of the measurement subframe.

Example 16 includes the apparatus of Example 15, wherein the plurality of PSS and the plurality of SSS are received from the eNodeB using non-cell specific reference signal (non-CRS) OFDM symbols of a single measurement subframe.

Example 17 includes the apparatus of any of Examples 15 to 16, wherein the first set of OFDM symbols and the second set of OFDM symbols are configured based on a number of cell-specific reference signal (CRS) antenna ports (APs).

Example 18 includes the apparatus of any of Examples 15 to 17, wherein the UE is configured for narrowband cellular Internet of Things (CIoT) or machine type communication (MTC).

Example 19 includes at least one machine readable storage medium having instructions embodied thereon for configuring measurement subframes for a user equipment (UE), the instructions when executed perform the following: identifying, using one or more processors at an eNodeB, a first set of orthogonal frequency division multiplexing (OFDM) symbols of a measurement subframe to transmit a plurality of primary synchronization signals (PSS) to the UE; identifying, using the one or more processors at the eNodeB, a second set of OFDM symbols of the measurement subframe to transmit a plurality of secondary synchronization signals (SSS) to the UE; processing, using the one or more processors at the eNodeB, the plurality of primary synchronization signals (PSS) for transmission to the UE using the first set of OFDM symbols of the measurement subframe; and processing, using the one or more processors at the eNodeB, the plurality of secondary synchronization signals (SSS) for transmission to the UE using the second set of OFDM symbols of the measurement subframe.

Example 20 includes the at least one machine readable storage medium of Example 19, wherein: the measurement subframe includes cell-specific reference signal (CRS) OFDM symbols and non-CRS OFDM symbols, wherein the CRS OFDM symbols include CRS resource elements (REs) and non-CRS REs; and a first portion of the non-CRS REs in the CRS OFDM symbols are configured as blank to reduce inter-cell interference and a second portion of the non-CRS REs in the CRS OFDM symbols are used to transmit CRS to increase a reference symbol density.

Example 21 includes the at least one machine readable storage medium of any of Examples 19 to 20, wherein: the measurement subframe includes a non-extended cyclic prefix (CP) for both slots or the measurement subframe includes an extended CP for both slots; and a number of cell-specific reference signal (CRS) antenna ports (APs) is two or four.

Example 22 includes the at least one machine readable storage medium of any of Examples 19 to 21, wherein the plurality of PSS and the plurality of SSS are transmitted from the eNodeB to the UE using non-cell specific reference signal (non-CRS) OFDM symbols of a single measurement subframe.

Example 23 includes the at least one machine readable storage medium of any of Examples 19 to 22, wherein: the measurement subframe occurs on at least one of subframe 0 and subframe 5 in a given frame; or a measurement subframe is configured based on a velocity of the UE and a delay sensitivity of the UE.

Example 24 includes an eNodeB operable to configure measurement subframes for a user equipment (UE), the eNodeB comprising: means for identifying, using one or more processors at an eNodeB, a first set of orthogonal frequency division multiplexing (OFDM) symbols of a measurement subframe to transmit a plurality of primary synchronization signals (PSS) to the UE; means for identifying a second set of OFDM symbols of the measurement subframe to transmit a plurality of secondary synchronization signals (SSS) to the UE; means for processing the plurality of primary synchronization signals (PSS) for transmission to the UE using the first set of OFDM symbols of the measurement subframe; and means for processing the plurality of secondary synchronization signals (SSS) for transmission to the UE using the second set of OFDM symbols of the measurement subframe.

Example 25 includes the eNodeB of Example 24, wherein: the measurement subframe includes cell-specific reference signal (CRS) OFDM symbols and non-CRS OFDM symbols, wherein the CRS OFDM symbols include CRS resource elements (REs) and non-CRS REs; and a first portion of the non-CRS REs in the CRS OFDM symbols are configured as blank to reduce inter-cell interference and a second portion of the non-CRS REs in the CRS OFDM symbols are used to transmit CRS to increase a reference symbol density.

Example 26 includes the eNodeB of any of Example 24 to 25, wherein: the measurement subframe includes a non-extended cyclic prefix (CP) for both slots or the measurement subframe includes an extended CP for both slots; and a number of cell-specific reference signal (CRS) antenna ports (APs) is two or four.

Example 27 includes the eNodeB of any of Example 24 to 26, wherein the plurality of PSS and plurality of SSS are transmitted from the eNodeB to the UE using non-cell specific reference signal (non-CRS) OFDM symbols of a single measurement subframe.

Example 28 includes the eNodeB of any of Example 24 to 27, wherein: the measurement subframe occurs on at least one of subframe 0 and subframe 5 in a given frame; or a measurement subframe is configured based on a velocity of the UE and a delay sensitivity of the UE.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of an eNodeB operable to configure measurement subframes for a user equipment (UE), the apparatus comprising one or more processors and memory configured to:
   identify, at the eNodeB, a first set of orthogonal frequency division multiplexing (OFDM) symbols of a measurement subframe to transmit a plurality of primary synchronization signals (PSS) to the UE in the measurement subframe, wherein the first set of OFDM symbols used to transmit the PSS is configured based on a number of cell-specific reference signal (CRS) antenna ports (APs), wherein the measurement subframe includes CRS OFDM symbols and non-CRS OFDM symbols, wherein the CRS OFDM symbols include CRS resource elements (REs) and non-CRS REs;
   identify, at the eNodeB, a second set of OFDM symbols of the measurement subframe to transmit a plurality of secondary synchronization signals (SSS) to the UE in the measurement subframe, wherein the second set of OFDM symbols used to transmit the SSS is configured based on the number of CRS APs;
   encode, at the eNodeB, the plurality of primary synchronization signals (PSS) for transmission to the UE using the first set of OFDM symbols of the measurement subframe; and
   encode, at the eNodeB, the plurality of secondary synchronization signals (SSS) for transmission to the UE using the second set of OFDM symbols of the measurement subframe;
   transmit the plurality of primary synchronization signals (PSS) to the UE using the first set of OFDM symbols of the measurement subframe, wherein the plurality of PSS are transmitted from the eNodeB to the UE using non-cell specific reference signal (non-CRS) OFDM symbols of a single measurement subframe; and
   transmit the plurality of secondary synchronization signals (SSS) to the UE using the second set of OFDM symbols of the measurement subframe, wherein the plurality of SSS are transmitted from the eNodeB to the UE using non-cell specific reference signal (non-CRS) OFDM symbols of the single measurement subframe.

2. The apparatus of claim 1, wherein the non-CRS REs in the CRS OFDM symbols are configured as blank.

3. The apparatus of claim 1, wherein the one or more processors and memory are further configured to: process CRS on CRS REs in the CRS OFDM symbols for transmission to the UE.

4. The apparatus of claim 1, wherein: a first portion of the REs in the CRS OFDM symbols are configured as blank to reduce inter-cell interference and a second portion of the REs in the CRS OFDM symbols are used to transmit CRS to increase a reference symbol density.

5. The apparatus of claim 1, wherein:
   the PSS is repetitively transmitted in the first set of OFDM symbols in the measurement subframe, and the first set of OFDM symbols includes symbols 1, 2 and 5; and
   the SSS is repetitively transmitted in the second set of OFDM symbols in the measurement subframe, and the second set of OFDM symbols includes symbols 3 and 6,
   wherein the measurement subframe includes a non-extended cyclic prefix (CP) for a first slot and a second slot included in the measurement subframe, and a number of cell-specific reference signal (CRS) antenna ports (APs) is two.

6. The apparatus of claim 1, wherein:
   the PSS is repetitively transmitted in the first set of OFDM symbols in the measurement subframe, and the first set of OFDM symbols includes symbols 2 and 5; and
   the SSS is repetitively transmitted in the second set of OFDM symbols in the measurement subframe, and the second set of OFDM symbols includes symbols 3 and 6,
   wherein: the measurement subframe includes a non-extended cyclic prefix (CP) for a first slot and a second slot included in the measurement subframe, a number of cell-specific reference signal (CRS) antenna ports (APs) is two, and symbol I is blank.

7. The apparatus of claim 1, wherein:
   the PSS is repetitively transmitted in the first set of OFDM symbols in the measurement subframe, and the first set of OFDM symbols includes symbols 2 and 5; and
   the SSS is repetitively transmitted in the second set of OFDM symbols in the measurement subframe, and the second set of OFDM symbols includes symbols 3 and 6,
   wherein the measurement subframe includes a non-extended cyclic prefix (CP) for a first slot and a second slot included in the measurement subframe, and a number of cell-specific reference signal (CRS) antenna ports (APs) is four.

8. The apparatus of claim 1, wherein:
   the PSS is repetitively transmitted in the first set of OFDM symbols in the measurement subframe, and the first set of OFDM symbols includes symbols I and 4; and
   the SSS is repetitively transmitted in the second set of OFDM symbols in the measurement subframe, and the second set of OFDM symbols includes symbols 2 and 5,
   wherein the measurement subframe includes an extended cyclic prefix (CP) for both slots and a number of CRS APs is two.

9. The apparatus of claim 1, wherein the measurement subframe occurs on at least one of subframe 0 and subframe 5 in a given frame.

10. The apparatus of claim 1, wherein a periodicity of the measurement subframe is configured based on a velocity of the UE and a delay sensitivity of the UE, wherein the periodicity of the measurement subframe is configured as 40 milliseconds (ms), 80 ms or 160 ms.

11. An apparatus of a user equipment (UE) operable to process synchronization signals received from an eNodeB, the apparatus comprising one or more processors and memory configured to:
- process, at the UE, a plurality of primary synchronization signals (PSS) received from the eNodeB in a measurement subframe, wherein the plurality of PSS are transmitted to the UE using a first set of orthogonal frequency division multiplexing (OFDM) symbols of the measurement subframe, wherein the first set of OFDM symbols used to transmit the PSS is configured based on number of cell-specific reference signal (CRS) antenna ports (APs); and
- process, at the UE, a plurality of secondary synchronization signals (SSS) received from the eNodeB in the measurement subframe, wherein the plurality of SSS are transmitted to the UE using a second set of orthogonal frequency division multiplexing (OFDM) symbols of the measurement subframe, wherein the second set of OFDM symbols used to transmit the SS is configured based on the number of CRS APs.

12. The apparatus of claim 11, wherein the plurality of PSS and the plurality of SSS are received from the eNodeB using non-cell specific reference signal (non-CRS) OFDM symbols of a single measurement subframe.

13. The apparatus of claim 11, wherein the UE is configured for narrowband cellular Internet of Things (CIOT) or machine type communication (MTC).

14. At least one non-transitory machine readable storage medium having instructions embodied thereon for configuring measurement subframes for a user equipment (UE), the instructions when executed perform the following:
- identifying, using one or more processors at an eNodeB, a first set of orthogonal frequency division multiplexing (OFDM) symbols of a measurement subframe to transmit a plurality of primary synchronization signals (PSS) to the UE, wherein the first set of OFDM symbols used to transmit the PSS is configured based on a number of cell-specific reference signal (CRS) antenna ports (APs);
- identifying, using the one or more processors at the eNodeB, a second set of OFDM symbols of the measurement subframe to transmit a plurality of secondary synchronization signals (SSS) to the UE, wherein the second set of OFDM symbols used to transmit the SSS is configured based on the number of CRS APs;
- processing, using the one or more processors at the eNodeB, the plurality of primary synchronization signals (PSS) for transmission to the UE using the first set of OFDM symbols of the measurement subframe; and
- processing, using the one or more processors at the eNodeB, the plurality of secondary synchronization signals (SSS) for transmission to the UE using the second set of OFDM symbols of the measurement subframe.

15. The at least one non-transitory machine readable storage medium of claim 14, wherein:
- the measurement subframe includes cell-specific reference signal (CRS) OFDM symbols and non-CRS OFDM symbols, wherein the CRS OFDM symbols include CRS resource elements (REs) and non-CRS REs; and
- a first portion of the REs in the CRS OFDM symbols are configured as blank to reduce inter-cell interference and a second portion of the REs in the CRS OFDM symbols are used to transmit CRS to increase a reference symbol density.

16. The at least one non-transitory machine readable storage medium of claim 14, wherein:
- the measurement subframe includes a non-extended cyclic prefix (CP) for both slots or the measurement subframe includes an extended CP for both slots; and
- a number of CRS-APs is two or four.

17. The at least one non-transitory machine readable storage medium of claim 14, wherein the plurality of PSS and plurality of SSS are transmitted from the eNodeB to the UE using non-cell specific reference signal (non-CRS) OFDM symbols of a single measurement subframe.

18. The at least one non-transitory machine readable storage medium of claim 14, wherein:
- the measurement subframe occurs on at least one of subframe 0 and subframe 5 in a given frame; or
- a measurement subframe is configured based on a velocity of the UE and a delay sensitivity of the UE.

* * * * *